June 18, 1963 C. H. ROELLI 3,094,654

BALANCED CURRENT SERIES TRANSISTOR REGULATOR

Filed Feb. 27, 1958 2 Sheets-Sheet 1

INVENTOR.
CONRAD H. ROELLI
BY John A Duffy
AGENT

June 18, 1963 C. H. ROELLI 3,094,654

BALANCED CURRENT SERIES TRANSISTOR REGULATOR

Filed Feb. 27, 1958 2 Sheets-Sheet 2

INVENTOR.
CONRAD H. ROELLI
BY John A Duffy
AGENT

United States Patent Office 3,094,654

Patented June 18, 1963

3,094,654

BALANCED CURRENT SERIES TRANSISTOR REGULATOR

Conrad H. Roelli, Portland, Oreg., assignor to North American Aviation, Inc.

Filed Feb. 27, 1958, Ser. No. 717,982
5 Claims. (Cl. 323—22)

This invention relates to a transistor current supply apparatus and more particularly to a transistor circuit utilizing a plurality of transistors connected in parallel with a series regulating transistor to improve the current carrying capacity of the regulating transistors.

Transistor circuits utilizing a series connected regulating transistor to control a plurality of current regulating transistors connected in parallel with the series transistor are shown and described in an application entitled "Series Transistor Regulator," Serial No. 698,967, filed November 26, 1957, in the name of George N. Klees. In the application filed by Klees, there is shown and described a series transistor regulator having a plurality of transistors connected to provide alternating-current paths between a source and a load in addition to a current path provided by a series connected regulating transistor. Each transistor of the respective current path is controlled by the current flowing through the series connected regulating-transistor. The amount of driving current is equal to the amount necessary to control the series connected regulated transistor. Any number of transistors may be connected to provide parallel current paths between a direct-current source and a load, depending upon the required current.

This invention contemplates a transistor series regulator circuit which is an improvement over the application to Klees described above. In accordance with the device of this invention, the current flowing in the regulating transistor and the transistors connected in parallel therewith is controlled to provide a balanced current by including in series with the transistors a circuit which balances the current flowing therein. As the current through a given transistor tends to increase or decrease relative to the current flowing in the other transistors, the control circuitry if this invention operates to vary the current which drives the regulating transistor tending to restore the current flowing therein to a predetermined balanced amount.

It is therefore an object of this invention to provide an improved transistor regulated power supply.

It is another object of this invention to provide a transistor regulator with improved control of the flow of current therein.

It is still another object of this invention to provide a transistor series regulator requiring less driving current to control the regulating transistors.

It is a further object of this invention to provide a transistor series regulator having a single transistor controlling a plurality of transistors connected in parallel therewith and control circuitry connected in series with the transistors to provide balanced current flow therein.

Figure 1:
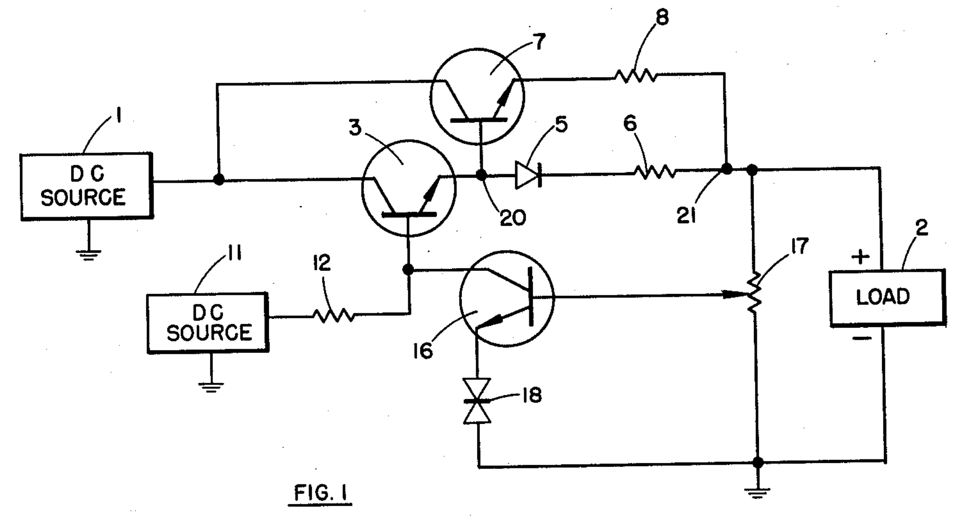
Figure 2:
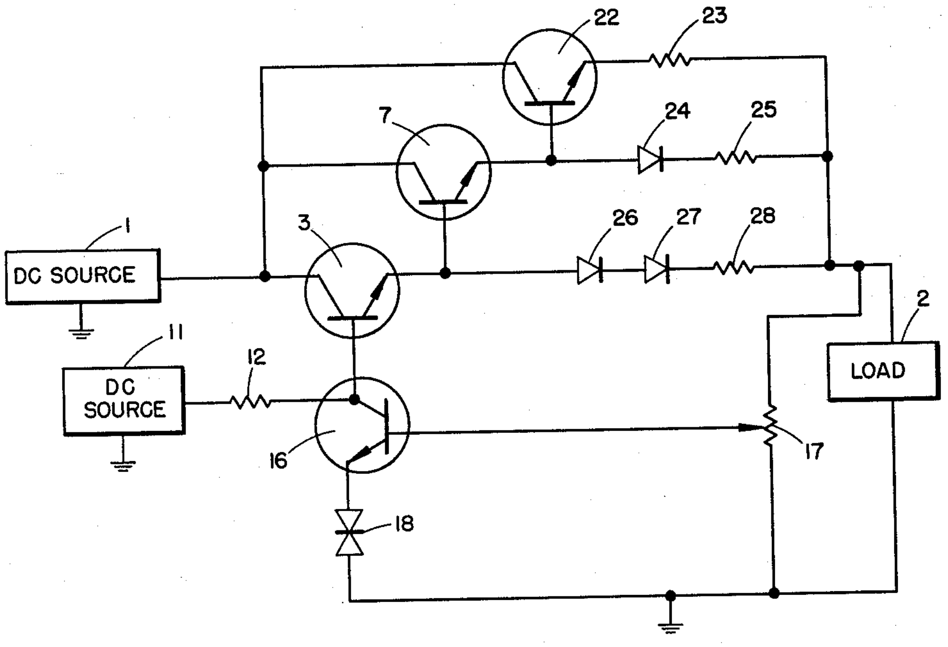
Figure 3:
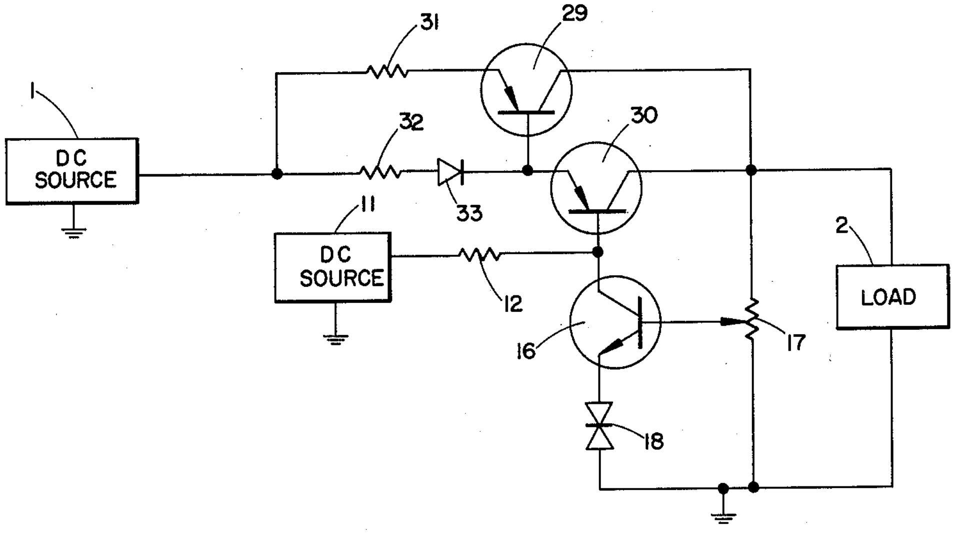

Other objects of the invention will become apparent from the following description taken in connection with the accompanying drawings, in which FIG. 1 is a schematic diagram of the preferred embodiment of this invention;

FIG. 2 is a schematic diagram of another embodiment of this invention showing a connection of a plurality of transistors in parallel with the series regulating transistor; and FIG. 3 is a schematic diagram of an embodiment of the invention utilizing p-n-p transistors.

Referring now to the drawings, there is shown in FIG. 1 a circuit for supplying current from a direct-current source 1 to a varying load 2. Current source 1 may be any direct-current unregulated voltage source. In series with source 1 and load 2 is current regulating device 3 which may be, for example, an n-p-n transistor comprising a collector connected to one side of direct-current source 1, and an emitter connected through diode 5 and resistor 6 to one side of load 2. Connected in parallel with transistor 3 and controlled thereby is shunting transistor 7 which may be, for example an n-p-n transistor having its collector connected to one side of direct-current source 1 and its emitter connected through resistor 8 to one side of load 2. The base of transistor 7 is connected to the emitter of transistor 3. Conduction in transistor 7 is controlled by the current flowing through the series path between source 1 and load 2 provided by transistor 3, diode 5 and resistor 6. A change in current through this path changes the current flowing in the base of transistor 7, thereby varying the flow of current through the path comprising direct-current source 1, the collector-emitter circuit of transistor 7, resistor 8 and load 2. Connected to transistor 3 to supply a base current proportional to the voltage across load 2 is a series circuit comprising resistor 12 connected alternatively to direct-current source 11 as shown or to direct-current source 1. Direct-current source 11 may be a regulated supply for providing the necessary base current to transistor 3 to correct for the collector leakage current which may be created in transistor 3 by temperature changes and the like. Also connected to the base of transistor 3 and resistor 12 is the collector of voltage sensing transistor 16 which is of the n-p-n type. Transistor 16 is controlled by having its base connected to an intermediate point of resistor 17, which in turn is connected in parallel across load 2. The voltage drop across resistor 17 varies in proportion to the voltage drop across load 2. A constant voltage reference is provided for transistor 16 by zener diode 18 which has one end connected to the emitter of transistor 16 and the other end to ground. Transistor 16 operates as a sensing amplifier detecting changes in voltage across load 2, amplifying these changes and controlling transistor 3 through its base in accordance therewith.

In order to control the amount of current flowing through transistors 3 and 7 connected to provide parallel current paths between direct-current source 1 and load 2, the circuitry comprising diode 5, resistor 6 and resistor 8 operates to sense changes in current through either path and maintains a balanced current by producing a signal which controls the flow of current through transistors 3 and 7. In order to maintain a balanced current with an equal amount of current flowing through transistor 3 and transistor 7, diode 5 is selected so as to have a forward voltage drop characteristic approximately equal to the voltage drop between the base-emitter junction of transistor 7. Thus, if transistor 7 is a silicon transistor, a silicon diode is required, and if transistor 7 is a germanium transistor, a germanium diode is required. Resistors 6 and 8 may be selected at any value desired and are selected to be of equal value to maintain an equal current in each of the current paths.

In order to more fully understand the operation of the balanced current control circuitry in this invention, reference will now be made to the particular operation of resistors 6 and 8 and diode 5 in the circuit. If the forward voltage drop of diode 5 is equal to the voltage drop of the base-emitter junction of transistor 7 as described above, and resistor 6 is equal in value to resistor 8, it may be seen that the voltage between point 20 which is the emitter of transistor 3 and point 21, which is the common connection of load 2, resistor 6 and resistor 8, will be equal to the voltage drop across the base-emitter junction of transistor 7 plus the IR drop across resistor 8, and also the voltage across diode 5 plus the IR drop through resistor 6. With the forward voltage drop across diode 5 equal to the voltage between the base and emitter of transistor 7, the following equation is developed:

$$V_{20-21}=V_{\text{base-emitter}}+I_1R_1 \text{ (drop across resistor 8)}$$

or $$=V_{\text{diode 5}}+I_2R_2 \text{ (drop across resistor 6)}$$

Thus, it is readily seen that the current flowing through resistor 8 will be equal to the current flowing through resistor 6, thereby creating a balanced current condition in the two parallel current paths between direct-current source 1 and load 2. Any tendency for one path to carry more or less current than the other path is sensed by the control circuitry described which operates to restore the paths to balanced condition again. For example, a tendency for an increase in the flow of current through transistor 3 results in an increase in the voltage drop between points 20 and 21. This increase increases the current flow in the base of transistor 7 correspondingly, which is amplified by the collector-emitter circuit increasing the flow of current in the current path through transistor 7 and resistor 8 until a balanced current is restored with the current flowing out of the emitter of transistor 7 equal to the current flowing out of the emitter of transistor 3 and the voltage across resistor 8 equal to the voltage across resistor 6. An increase in current through transistor 7 causes a similar operation to return the current paths to a balanced condition.

In operation of the current regulating function of the device in FIG. 1, current flows from direct-current source 1 through transistor 7 and resistor 8 for one path and through transistor 3, diode 5 and resistor 6 for the other path to load 2. Changes in voltage across load 2 are sensed by amplifying transistor 16 which presents a driving current to the base of transistor 3 proportional to the change in voltage across load 2. The driving current tends to decrease or increase the current through transistor 3 in accordance with the increase or decrease in the voltage across load 2 maintaining a constant voltage. Thus, for example, increase in voltage across load 2 decreases the driving current supplied to the base of transistor 3 by transistor 16 thereby decreasing the collector-to-emitter current of transistor 3 thus tending to reduce the voltage across load 2 until it reaches the predetermined reference level set by diode 18. A decrease in current through transistor 3 decreases the voltage drop between points 20 and 21 which decreases the base current to transistor 7 thereby decreasing the current flowing in the collector-emitter circuit of transistor 7 until an equal current is flowing in the two current paths between source 1 and load 2.

As shown in FIG. 1, two alternate current paths each having a regulating transistor are connected between source 1 and load 2. If a larger current is required than both transistors are able to pass, more transistors may be connected in shunt arrangement with transistor 3 as shown, for example, in FIG. 2. In FIG. 2, transistor 7 is connected in parallel with transistor 3 as in FIG. 1 and transistor 22 is connected in parallel with transistors 7 and 3 having its collector connected in common with the collectors of transistors 7 and 3 and its emitter connected through resistor 23 to one side of load 2. The base of transistor 22 is connected to the emitter of transistor 7 and the base of transistor 7 is connected to the emitter of transistor 3. Balanced current is maintained in the three paths provided by transistors 3, 7, and 22 between source 1 and load 2 by circuitry comprising resistor 23 connected in series between the emitter of transistor 22 and load 2, diode 24 and resistor 25 connected in series between the emitter of transistor 7 and load 2, and diodes 26 and 27 and resistor 28, all connected in series between the emitter of transistor 3 and load 2. The forward voltage drop of diode 24 is equal to the voltage drop of the base-emitter junction of transistor 22. The combined forward voltage drop of diodes 26 and 27 is equal to the combined voltage drop of the base-emitter junctions of transistors 7 and 22. Resistors 23, 24, and 28 are of equal value. The current through each of the three current paths is maintained the same by resistors and diodes in the emitter circuits of transistors 22, 7, and 3. Any tendency of one of the transistors to increase in current creates a corresponding increase in the base currents of the other transistors thereby tending to balance the current.

Turning now to FIG. 3 there is shown an embodiment of the invention utilizing p-n-p transistors as the regulating devices. P-n-p transistors 29 and 30 are connected to form parallel current paths between direct-current source 1 and load 2. Conduction in transistors 29 and 30 is balanced by the action of resistors 31 and 32 and diode 33. Conduction in transistor 29 is controlled by the current flowing through the series path between source 1 and load 2 provided by resistor 32, diode 33 and transistor 30. A change in current through the path operates in a manner as described in relation to FIG. 1 to vary the signal current on the base of transistor 29 to thereby tend to balance the flow through the two current paths.

In the circuits of FIG. 1 and 2 the gain of the transistors may vary with the control circuitry of resistors and diodes still maintaining an equal current flow in the paths through the transistors.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In combination, a first transistor having collector, emitter, and base electrodes, means for supplying current from a source through the collector-emitter path of said first transistor to a load, means for impressing upon the emitter with respect to the base of said first transistor a potential having variations corresponding to load voltage changes, a second transistor having collector, base, and emitter electrodes, the collector-emitter path of said second transistor connected in parallel with the collector-emitter path of said first transistor, means for equalizing the current flowing through said transistors, said equalizing means comprising unidirectional conducting means series connected in the collector-emitter circuit of said first transistors, the voltage characteristic of said unidirectional conducting means being identical to that of the base-emitter circuit of said second transistor, and means responsive to said unidirectional conducting means for impressing on the base of said second transistor a current proportional to the voltage drop across said unidirectional conducting means.

2. In combination, a first transistor having a collector, an emitter, and a base, means for supplying current from a source through the collector-emitter path of said first transistor to a load, means for impressing upon the emitter with respect to the base of said first transistor a potential having variations corresponding to load voltage changes, a second transistor having a collector, an emitter, and a base, means for supplying current from said source through the collector-emitter path of said second transistor to said load, and means for substantially equalizing the current supplied through said transistors from said source to said load, said last mentioned means comprising a first current path between the emitter of said first transistor and said load, a second current path between the emitter of said first transistor and said load, said first current path comprising a diode and a resistor connected in series between the emitter of said first transistor and said load, said second current path comprising the path provided by the base to emitter junction of said second transistor and a second resistance means, said base-emitter of said second transistor and said second resistance means connected in series between the emitter of said first transistor and said load, said diode comprising the same material as the base-emitter junction of said second transistor.

3. The combination recited in claim 2 wherein the resistance of said series connected diode and resistor is substantially equal to the combined resistance of said second resistance means and the resistance of said base-emitter of said second transistor.

4. In combination, a first transistor having at least a collector, an emitter, and a base, first means for supplying current from a source through the collector-emitter path of said first transistor to a load, means for impressing upon the emitter with respect to the base of said first transistor a potential having variations corresponding to load voltage changes, a second transistor having at least a collector, an emitter, and a base, the collector-emitter path of said second transistor connected in parallel with the collector-emitter path of said first transistor to provide a second means for supplying current from said source to said load, first resistance means comprising a diode and a resistance series connected in the collector-emitter path of said first transistor, said diode having a forward voltage drop characteristic substantially equal to the forward voltage drop characteristic between the base and emitter of said second transistor, second resistance means connected in the collector-emitter path of said second transistor, and means connecting said emitter of said first transistor to the base of said second transistor for maintaining the current through said first and second resistance means substantially equal.

5. The structure of claim 4 including a third transistor having at least a collector, an emitter and a base, the collector-emitter path of said third transistor connected in parallel with the collector-emitter paths of said first and second transistors to provide a third means for supplying current from said source to said load, a third resistance means connected in the collector-emitter path of said third transistor, a second diode series connected with said first mentioned diode, said second diode having a forward voltage drop characteristic similar to that of said first diode, and a third diode series connected with said second resistance means in the collector emitter path of said second transistor, said third diode having a forward voltage drop characteristic substantially equal to the forward voltage drop characteristic between the base and emitter of said third transistor.

References Cited in the file of this patent

UNITED STATES PATENTS

| | | |
|---|---|---|
| 2,693,568 | Chase | Nov. 2, 1954 |
| 2,698,416 | Sherr | Dec. 28, 1954 |
| 2,806,198 | Fredrick | Sept. 10, 1957 |
| 2,906,941 | Brolin | Sept. 29, 1959 |
| 2,967,991 | Deuitch | Jan. 10, 1961 |